(12) United States Patent
Ham et al.

(10) Patent No.: US 11,632,342 B2
(45) Date of Patent: Apr. 18, 2023

(54) INSTANT MESSAGING SERVICE FOR PROVIDING PROFILE VIEW WITH VIDEO BACKGROUND

(71) Applicant: KAKAO CORP., Jeju-si (KR)

(72) Inventors: Hyo Jin Ham, Seongnam-si (KR); Seung Bo Cho, Seongnam-si (KR); Eun Lee, Seongnam-si (KR); Hyo Joo Park, Seongnam-si (KR); Gi Wan Kim, Seongnam-si (KR); Eung Ju Park, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 0 days.

(21) Appl. No.: 16/845,083

(22) Filed: Apr. 10, 2020

(65) Prior Publication Data

US 2020/0328994 A1 Oct. 15, 2020

(30) Foreign Application Priority Data

Apr. 12, 2019 (KR) .................. 10-2019-0043337

(51) Int. Cl.
*H04L 51/10* (2022.01)
*H04L 51/046* (2022.01)
*H04L 67/306* (2022.01)
*H04L 51/066* (2022.01)

(52) U.S. Cl.
CPC .......... *H04L 51/046* (2013.01); *H04L 51/066* (2013.01); *H04L 51/10* (2013.01); *H04L 67/306* (2013.01)

(58) Field of Classification Search
CPC ..... H04L 51/066; H04L 51/063; H04L 51/10; H04L 67/306; H04L 51/046
See application file for complete search history.

(56) References Cited

U.S. PATENT DOCUMENTS

| 9,729,352 | B1 * | 8/2017 | Stoler | H04L 51/04 |
|---|---|---|---|---|
| 10,462,293 | B2 * | 10/2019 | Borukhoff | H04L 65/1076 |
| 2008/0086747 | A1 * | 4/2008 | Rasanen | H04N 21/4622 725/46 |
| 2013/0232200 | A1 * | 9/2013 | Knapp | H04L 67/306 709/204 |
| 2016/0150281 | A1 * | 5/2016 | Whaley | H04N 21/4396 715/719 |
| 2016/0196052 | A1 * | 7/2016 | Franklin | G06F 3/04845 715/765 |
| 2020/0120170 | A1 * | 4/2020 | Amitay | H04W 4/021 |

FOREIGN PATENT DOCUMENTS

| KR | 1020140027011 A | 3/2014 |
|---|---|---|
| KR | 1020140052796 A | 5/2014 |
| KR | 1020150044442 A | 4/2015 |

* cited by examiner

*Primary Examiner* — Ryan J Jakovac
(74) *Attorney, Agent, or Firm* — Cantor Colburn LLP

(57) ABSTRACT

A messenger application for a second account related to at least one account in an instant messaging service receives, from a server, a list of at least one first account for which a video is registered and recommends a first account using a list view that shows the list of the at least one first account distinguished from a list of the at least one account.

12 Claims, 3 Drawing Sheets

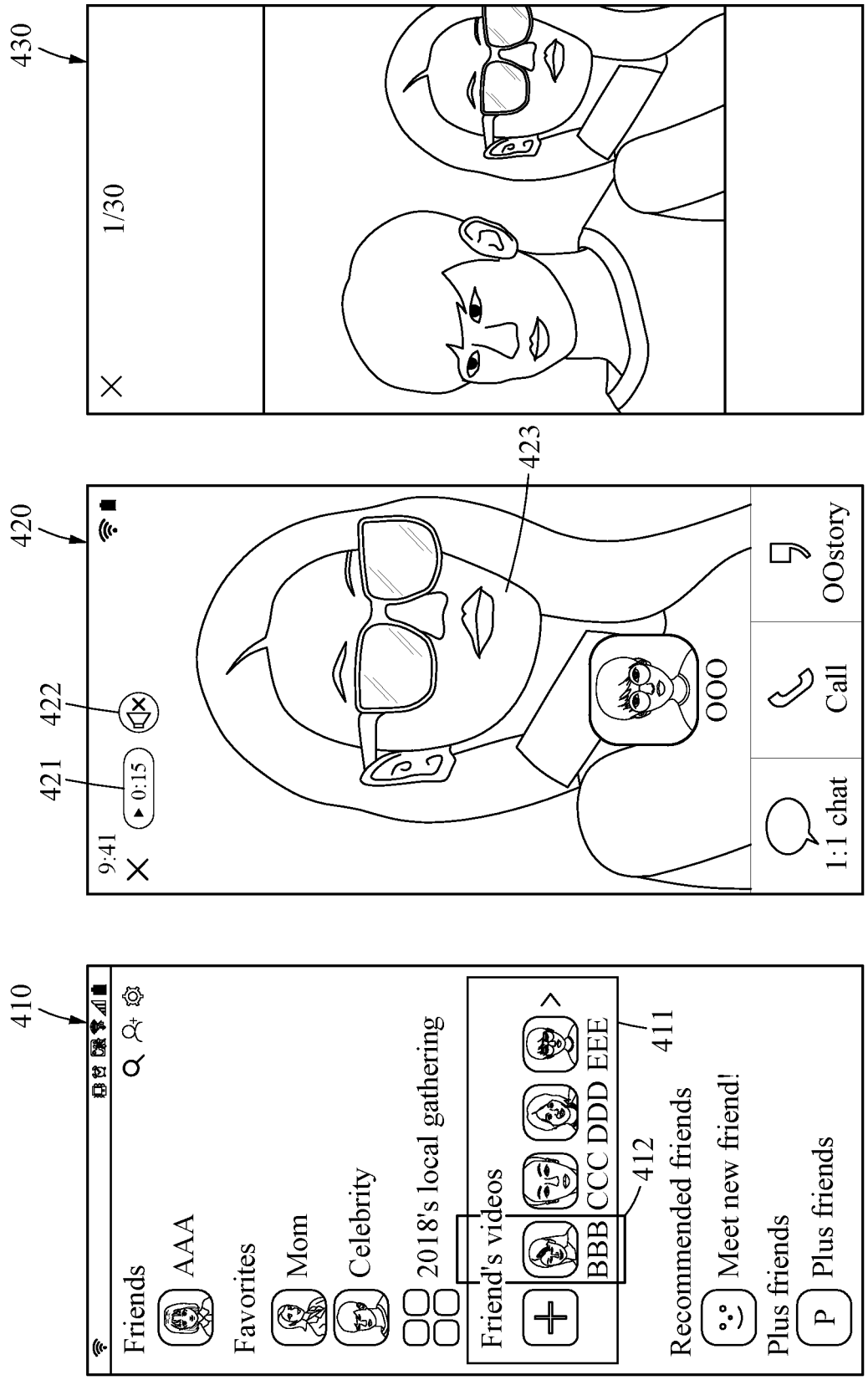

INSTANT MESSAGING SERVICE FOR PROVIDING PROFILE VIEW WITH VIDEO BACKGROUND

CROSS-REFERENCE TO RELATED APPLICATION(S)

This application claims the priority benefit of Korean Patent Application No. 10-2019-0043337 filed on Apr. 12, 2019, in the Korean Intellectual Property Office, the disclosure of which is incorporated herein by reference for all purposes.

BACKGROUND

1. Field

One or more example embodiments relate to an instant messaging service that provides a profile view having a video background and, more particularly, to a method and apparatus for recommending a friend who registered a video as a background of a profile view using a friend list of a messenger.

2. Description of Related Art

With the rapid development of information and communication technology and the emergence of smart devices, various forms of social network service (SNS) services are being used. In particular, an instant messaging application in which a plurality of users opens a chat room to sends and receives messages in the chat room is widely used. Such chat services based on the instant messaging application are being developed to provide various functions for satisfying users.

In related arts, a friend list may be generated based on contact information stored in a terminal and/or accounts of the instant messaging service. The generated friend list may be displayed using a profile image set by each user.

According to an expansion of a service area of the instant messaging application, an applicability of a profile view that represents a user by more than simply providing a profile image is also increasing.

SUMMARY

An aspect provides technology for recommending a friend using a friend list when the friend uploads a video as a background of a profile view.

Another aspect also provides technology for displaying, when a friend recommended using a friend list is selected, a profile view in which a video set by the friend is displayed.

Another aspect also provides technology for editing a profile view in various ways such as setting a video as a background of a profile view of a user.

According to an aspect, there is provided an operation method of a messenger application for a second account related to at least one account in an instant messaging service, the method including receiving, from a server that provides the instant messaging service, a list of at least one first account among the at least one account, the at least one first account for which a video exposed through a profile view is registered, and recommending the at least one first account to a user of the second account using a list view that shows the list of the at least one first account distinguished from a list of the at least one account.

The operation method may further include receiving an input of selecting an account from the list of the at least one first account recommended using the list view, and displaying a profile view of the selected account in which a registered video corresponding to the selected account is played as a background or a play view in which the registered video corresponding to the selected account is played.

The operation method may further include receiving an input corresponding to a direction among a plurality of predetermined directions while the profile view or the play view is displayed, identifying an account adjacent to the selected account in the direction in the list of the at least one first account, and displaying one of a profile view of the identified account in which a registered video corresponding to the identified account is played as a background or a play view in which the registered video corresponding to the identified account is played.

The list view may show the at least one account using at least one first-type list element and show the list of the at least one first account using a second-type list element.

When the profile view is displayed, the displaying may include determining whether a predetermined condition related to playing of the video is satisfied, and automatically repetitively playing the corresponding video as a background of the profile view of the selected account in accordance with a determination that the predetermined condition is satisfied.

The operation method may further include displaying a static image set by the selected account as a background of the profile view of the selected account in accordance with a determination that the predetermined condition is unsatisfied.

The at least one first account may include one or more accounts for which a video is registered as a background of a profile view within a predetermined time period.

The at least one first account may include an account in a friend relationship with the second account in the instant messaging service.

The recommending may include sorting the at least one first account based on a predetermined sorting order, and displaying the at least one first account using the list view based on a result of the sorting.

The predetermined sorting order may include at least one of a sorting order related to a video registered by the at least one first account and a sorting order related to a message exchanged with the at least one first account.

The at least one first account may include an account that has agreed to recommend a registered video to another terminal.

When a plurality of videos is registered within a predetermined time in the same account among the at least one first account, the recommending may include recommending the corresponding account based on a recently registered video.

The operation method may further include displaying an interface that prompts a registration of a video as a background of a profile view of the second account using a list element of a type by which the list of the at least one first account is represented.

The operation method may further include displaying an edit view providing a function of editing a profile view of the second account and a preview function for an edited profile view.

According to another aspect, there is also provided an operation method of a server that provides an instant messaging service, the method including receiving a request for registration of a video exposed through a profile view from a terminal of at least one first account, registering a video requested to be registered to correspond to each of the at least one first account, identifying at least one second account respectively related to the at least one first account in the instant messaging service, and transmitting, to a terminal of each of the at least one second account, a list of the at least one first account distinguished from a list of at least one account related to the corresponding second account in the instant messaging service.

The operation method of the server may further include receiving, from one of terminals of the at least one second account, an account selected from the list of the at least one first account transmitted to the terminal of the corresponding second account, and providing, to the terminal of the corresponding second account, one of a profile view of the selected account in which a registered video corresponding to the selected account is played as a background or a play view in which the registered video corresponding to the selected account is played.

The operation method of the server may further include receiving, from the terminal of the corresponding second account, an input indicating a direction among a plurality of predetermined directions, identifying an account adjacent to the selected account in the direction in the list of the at least one first account transmitted to the terminal of the corresponding second account, and providing, to the terminal of the corresponding second account, one of a profile view of the identified account in which a registered video corresponding to the identified account is played as a background or a play view in which the registered video corresponding to the identified account is played.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 4 illustrates screenshots of a messenger application according to an example embodiment.

DETAILED DESCRIPTION

Figure 1:
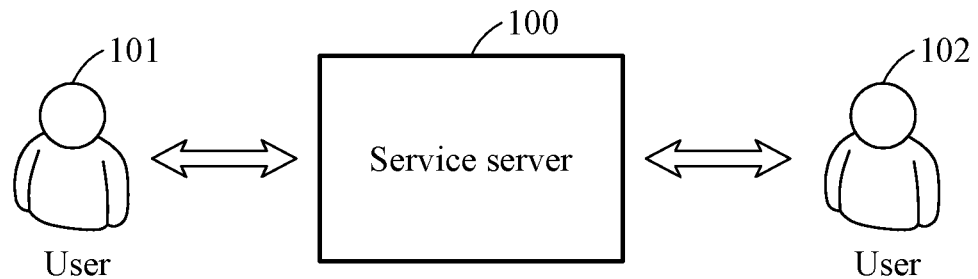
FIG. 1 is a diagram illustrating a relationship between a messaging service server and a user according to an example embodiment.

The following structural or functional descriptions are exemplary to merely describe the exemplary embodiments, and the scope of the exemplary embodiments is not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, reference will now be made in detail to examples with reference to the accompanying drawings, wherein like reference numerals refer to like elements throughout.

FIG. 1 is a diagram illustrating a relationship between a messaging service server and a user according to an example embodiment.

Referring to FIG. 1, an instant messaging service may include a first user 101, a second user 102, and a messaging service server 100 as entities. The first user 101 and the second user 102 may be clients of the instant messaging service. The first user 101 and the second user 102 may access the messaging service server 100 using terminals in which a messenger application is installed.

The terminals of the first user 101 and the second user 102 may be electronic devices, for example, a computer, an ultra-mobile PC (UMPC), a workstation, a net-book, personal digital assistants (PDA), a portable computer, a web tablet, a wireless phone, a mobile phone, a smartphone, an e-book, a portable multimedia player (PMP), a portable game console, a navigator, a black box, or a digital camera. Also, the terminals of the first user 101 and the second user 102 may be any user device in which a messenger application related to the messaging service server 100 is installed and executed. The user device may perform overall service operations such as service screen configuration, data input, data transmission and reception, and data storage under a control of the messenger application.

The messaging service server 100 may serve as a service platform that provides a messenger service to a client. The messenger application may include a computer, a database, a module, or a program, which is operated to perform a function to write and send a text, a function to send multimedia content (e.g., a sound file, a picture, a video, etc.), a message notification function, a scheduling function, and the like, for example.

As described below, an instant messaging service may provide a technique for improving a utilization of a profile view provided on a messenger application. The profile view may be a view in which a profile of a user is represented, and may include a profile image and profile information of the user. In addition to the profile image and the profile information, the profile view may further include various items that represent the user.

For example, users may set backgrounds of profile views using videos. When a user sets a video as a background of a profile view, recommendation information indicating that the video has been set as the background of the profile view of the user may be provided to another user having a friend relationship with the user. The recommendation information may be displayed on a list view showing a friend list in a terminal of the other user. The list view may be a view interface that presents data nodes stored in a list data structure and, for example, include list elements corresponding to the data nodes stored in the list data structure. For example, the list view may show a plurality of friends included in the friend list to be distinguished in row units. In this case, information about each of the friends included in the friend list may be stored in the corresponding data node in the list data structure, so that the list view shows the corresponding information using each of the list elements corresponding to the data nodes. In the case in which the list view shows the plurality of friends in row units, it may be understood that each of the rows corresponds to the individual list element.

As described below, the recommendation information may be exposed in a predetermined recommendation region in the list view. The recommendation region may include a separate list distinguished from a general friend list. The recommendation region may be implemented using a list element of a type different from that of a list element for the general friend list.

Through this, embodiments may improve the utilization of the profile view on the instant messaging service and provide a function to share the video set as the background of the profile view among users having friend relationships. According to an example embodiment, a service may be operated to recommend only a friend who registered a video as a background of a profile view within a predetermined time period (e.g., 24 hours or today). Further, according to an example embodiment, a video to be set as a background of a profile view may be limited to a video having a predetermined size (e.g., time or capacity) or less. A function of automatically sharing a video registered as a background of a profile view through a recommendation (hereinafter, referred to as "friend's registered video recommending function") will be described later.

For ease of description, the following description will be based on an example in which a friend who registered a video as a background of a profile view is recommended using a list view. However, embodiments are not limited thereto. In addition to the background of the profile view, embodiments may apply in a case in which a friend is recommended using a list view when a video exposed through a profile view related to an account of the friend on a messaging service is registered.

Users may edit profile views variously ways using an edit view for editing a profile view. The edit view may provide an editing function that applies various items (e.g., music, stickers, visual effects, etc.) to the profile view. Also, the edit view may provide a set item in which at least two of the music, the stickers, or the visual effects are combined in advance. The edit view may provide a preview function to check an editing result of the profile view in real time during the editing.

A messenger application may use a predetermined region in a friend list to display an interface that induces a user to edit a profile view of the user. When the interface is selected, an edit view for editing the profile view of the user may be displayed, or a screen for setting a video as a background of the profile view of the user may be directly displayed. Through this, embodiments may provide an intuitive interface for easily editing the profile view of the user while allowing the user and friends to easily share the video set as the background of the profile view.

Although "friend relationship" has been described as an example for brevity, in addition to the "friend relationship", the present disclosure may be substantially equally applied to a relationship of a predetermined level or higher. The predetermined level may be determined based on various references, for example, whether a history of conversation with a target account is present, whether a user and the target account are participating in the same group chat room, whether the user is subscribing the target account when the target account is a corporate account, and whether friends of the user are in friend relationships with the target account.

The messenger application may be implemented to be available in a mobile environment as well as a personal computer (PC) environment. Also, the messenger application may be implemented as an independently operating program, or provided as an in-app of a specific application to be operable in the application.

According to an example embodiment, although FIG. 1 illustrates a first user 101 and a second user 102 distinguished from each other, the first user 101 and the second user 102 may serve as the second user 102 and the first user 101, respectively to perform the above-described tasks.

Although not shown, the messaging service server 100 may include a communicator, a memory, and a controller. The aforementioned components are not essential to implementing the messaging service server 100, so the messaging service server 100 described herein may have more or fewer components than those listed above.

The communicator may include a module, a program, or an electronic device that transmits and receives data to and from a terminal of the second user 102 wirelessly or wired, and a terminal of the first user 101. A communication protocol used by the communicator may include, for example, code division multiple access (CDMA) communication, wideband code division multiple access (WCDMA) communication, or wireless broadband communication. In this case, a wireless communication network may include, for example, wireless local area network (WLAN), wireless fidelity (Wi-Fi), wireless broadband (Wibro), world interoperability for microwave access (WiMAX), high-speed downlink packet access (HSDPA), long term evolution (LTE), an Institute of Electrical and Electronics Engineers (IEEE) 802.16 standard, and wireless mobile broadband service (WMBS). Also, a local area network may include, for example, beacon, Bluetooth, radio frequency identification (RFID), infrared data association (IrDA), ultra-wideband (UWB), ZigBee, and Z-Wave. However, the present disclosure is not limited thereto.

The memory may include a dynamic storage device that stores dynamic information and instructions for execution by the controller, such as random access memory (RAM). However, the present disclosure is not limited thereto. The memory may also include a static storage device that stores static information and instructions for use by the controller, such as read-only memory (ROM). The memory may be a volatile memory unit or a non-volatile memory unit. The memory may also be another type of computer-readable medium such as a magnetic or optical disk.

The controller may control an overall operation of the messaging service server. The controller may include any type of typical processor, microprocessor, or processing logic that interprets and executes instructions. The controller may execute instructions stored in the memory to display graphical information for a graphical user interface (GUI) on an external input/output (I/O) device such as a display connected to a high-speed interface.

The controller may operate an operating system (OS) and one or more messenger applications executed on the OS. Also, in response to a messenger application being executed, the controller may access, store, manipulate, process, and generate data. The messenger applications may be distributed on computer systems connected through a network, so as to be stored or executed in a distributed manner. The messenger applications and data may be stored in one or more computer-readable media.

A user terminal may include a communicator, a controller, a memory, a display, and an interface to communicate with the messenger application and the messaging service server. The aforementioned components are not essential to implementing the user terminal, so the user terminal described herein may have more or fewer components than those listed above.

The messenger application may be stored in the memory to be executed by the controller, so that a video registered as a background of a profile view received from the messaging service server through the interface is displayed on the display of the user terminal.

Specifically, the communicator may include a module, a program, or an electronic device that transmits and receives to and from a terminal device. The communicator may include, for example, a short-range communication module, a Wi-Fi communication module, and a mobile communication module. In addition, the communicator may include other short-range communication modules such as a Bluetooth module, an IrDA module, a near field communication (NFC) module, a ZigBee module, and the like and a WLAN module.

The display may display a computation result of the controller. The computation result may be displayed based on a GUI. The display may be a configuration for displaying various display objects. The display may be implemented by various display technologies such as organic light emitting diodes (OLED), liquid crystal display (LCD) panel, plasma display panel (PDP), vacuum fluorescent display (VFD), field emission display (FED), electroluminescence display (ELD), and the like. The display may also be implemented as a flexible display and a transparent display, for example.

The interface may receive an input from a user. The interface may include an input device such as a button-type input device, a touch screen, a keyboard, a mouse, or the like. For example, the touch screen may be formed on a top surface of the display and receive an input through touching of the user. However, the present disclosure is not limited thereto.

Figure 2:
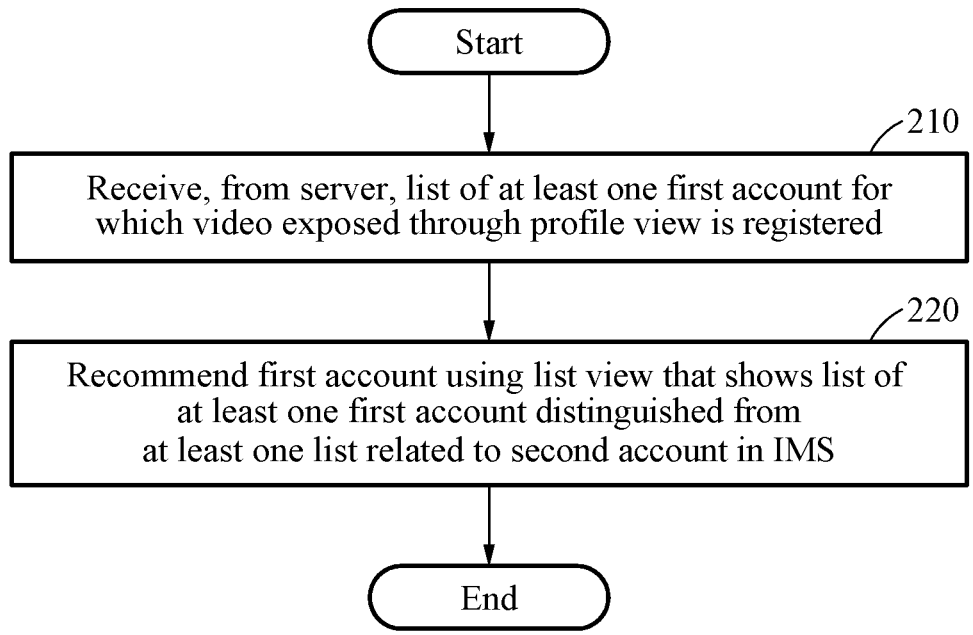
FIG. 2 is a flowchart illustrating an operation method of a messenger application according to an example embodiment.

FIG. 2 is a flowchart illustrating an operation method of a messenger application according to an example embodiment.

Referring to FIG. 2, operations 210 and 220 may be performed by the user terminal described with reference to FIG. 1. Since the description of FIG. 1 is also applicable here, repeated description of FIG. 2 will be omitted.

In operation 210, a messenger application receives, from a server, a list of at least one first account for which a video exposed through a profile view is registered. As described above, registering the video exposed through the profile view may be understood as a concept that comprehensively includes registering the video as a background of the profile view and registering the video in a posting space of an account provided in the messaging service through the profile view, for example.

The list of the at least one first account may include at least one of identification information of each of the at least one first account (e.g., phone number, ID, etc.), information indicating that a video corresponding to each of the at least one first account is registered (e.g., previously agreed flag bits, etc.), and information associated with a video exposed through a profile view of each of the at least one first account.

In some cases, the server may perform a recommending operation for only a video registered in a predetermined time period. In such cases, even if the account has been previously recommended, if the account does not meet a condition of the predetermined time period, the account may be removed from a recommendation list.

In operation 220, the messenger application recommends the at least one first account using a list view that shows the list of the at least one first account (e.g., a friend's registered video recommending list) distinguished from at least one list (e.g., a friend list) related to a second account in an instant messaging service.

The at least one first account may be understood as a concept that includes a single account or a plurality of accounts for which a video exposed through a profile view is registered. Hereinafter, although embodiments are described under an assumption that the first account is a single account for ease of description, the following embodiments may be substantially equally applied to a case in which the first account includes a plurality of accounts. For example, when the first account includes a plurality of accounts, the following embodiments of the single account may be applied to correspond to each of the plurality of accounts.

The messenger application may use a region (e.g., a recommendation region) designated in the list view to recommend the first account of which a background of a profile view is set as a video to a user. The list view may include a plurality of list elements. The recommendation region may include a second type list element (e.g., a list element for recommendation) distinguished from a first type list element (e.g., a general list element) included in the list view. The list view may represent other accounts (e.g., friend accounts) related to the second account using general list elements. The list element for recommendation may provide an interface distinguished from that of the general list element. For example, the list element for recommendation may provide an interface that recommends one or more video registration accounts.

Here, "setting the background of the profile view as the video" may be understood as including a case in which a preset video is replaced by a new video in addition to a case in which the background of the profile view is initially set as a video and a case in which a preset static image is replaced with a video.

Also, when a plurality of recommended friends is included in the first account, the messenger application may sort the recommended friends and display the recommended friends based on a result of the sorting.

The recommended friends may be sorted in various ways. For example, the recommended friends may be sorted based on an order in which videos are registered. Also, the recommended friends may be sorted based on a sorting order related to messages exchanged with the recommended friends. The sorting order related to messages exchanged with the recommended friends may include, for example, an order of the messages exchanged with the recommended friends or an order based on a number of the messages exchanged with the recommended friends.

The messenger application may display a predetermined number of friends by priority based on the sorting order. When an ordinal number of a friend is after the predetermined number, the messenger application may display the friend based on an additional input from a user. The sorting of the recommended friends may be performed in the messenger application or may be performed by the server such that a result of the sorting is transmitted to the messenger application.

The messenger application may provide an option for activating or deactivating a friend's registered video recommending function. When the friend's registered video recommending function is deactivated, the messenger application may not provide a function of recommending a friend who registered a video as a background of a profile view. Also, when the friend's registered video recommending function is deactivated, even if the user registers a video as a background of a profile view of the user, the corresponding content may not be shared with other friends. In some cases, even in a state in which the friend's registered video recommending function is activated, a friend with a limited relationship (e.g., a blocked friend) may be excluded from the recommendation list. Also, one of a function of recommending my video and a function of receiving a recommendation for a friend's video included in the friend's registered video recommending function may be selectively deactivated.

A friend who has registered a video as a background of a profile view, and then changed the video to an image may be excluded from the recommendation list. Also, A friend's terminal having relationship information of a predetermined level or less, for example, a hidden friend, a blocked friend, a friend whose account has been deleted, and a friend whose profile is private may not be included in the recommendation list irrespective of whether a video is registered as a background of a profile view.

A friend who has registered a plurality of videos within a predetermined time period as a background of a profile view may be recommended based on a recently registered video.

When a friend recommended in the recommendation region in the friend list is selected, the messenger application may display a profile view of the friend in which the set video is played as a background. In other words, the video registered as the background of the profile view may be played in a background region of the profile view. Also, when the friend recommended in the recommendation region in the friend list is selected, the messenger application may display a play view that plays the set video.

Screens displayed in the list view (the friend list) and the profile view will be described in detail with reference to FIG. 4.

According to an example embodiment, the messenger application may receive a directional input (e.g., a swipe input) while displaying the profile view in which the video registered as the background by the selected friend is played. The directional input may correspond to one of a plurality of predetermined directions. For example, when a leftward direction and a rightward direction are determined in advance, the directional input may be mapped to either the leftward direction or the rightward direction.

In response to the directional input, the messenger application may identify a friend adjacent to the currently selected friend in the corresponding direction in the recommendation list. The messenger application may display a profile view of the friend identified in the recommendation list through the directional input. For example, when a swipe input of the leftward direction is received, the messenger application may display a profile view of a friend recommended earlier than the currently selected friend in the recommendation list. Also, when a swipe input of the rightward direction is received, the messenger application may display a profile view of a friend recommended later than the currently selected friend in the recommendation list.

When the messenger application displays a play view instead of the profile view of the selected friend in the recommendation region, a play view in which a video registered by a recommended friend adjacent to the selected friend is played may be displayed in response to a swipe input.

In some cases, an operation of identifying a friend adjacent to a currently selected friend in a recommendation list in response to a directional input may also be performed by the server.

The video registered as the background of the profile view may be automatically repetitively played in a background region of the profile view if a predetermined condition is satisfied. The predetermined condition may include, for example, user settings for auto-repeat playback or whether a terminal is connected to the Internet using a Wi-Fi network. When the predetermined condition is not satisfied, a static image set by a corresponding friend or automatically extracted from a video may be displayed in the background region of the profile view.

Figure 3:
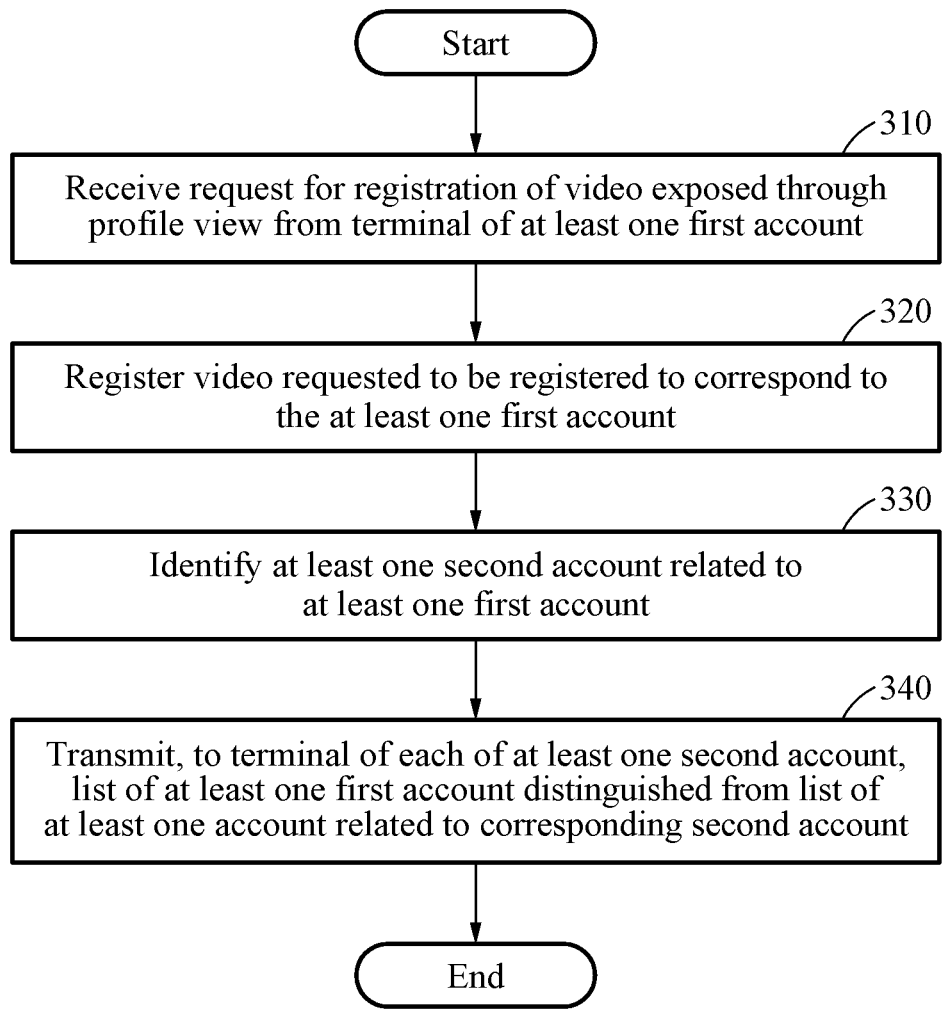
FIG. 3 is a flowchart illustrating an operation method of a server according to an example embodiment.

FIG. 3 is a flowchart illustrating an operation method of a server according to an example embodiment.

Referring to FIG. 3, in operation 310, a server may receive, from a first account, a request to register a video as a background of a profile view. In operation 320, the server may register the video as the background of the profile view for the first account.

In operation 330, the server may identify at least one second account related to the first account to recommend the video registered in the profile view of the first account to another user. Being related to the first account may indicate, for example, being in a friend relationship with the first account, subscribing the first account, or being in a relationship between which it has explicitly agreed or implied that a recommendation about the video registered as the background of the profile view of the first account is acceptable at least.

In operation 340, the server may transmit information on the first account to the at least one second account. As described above, the information on the first account may include at least one of identification information of the first account (e.g., phone number, ID, etc.), information indicating that the video is registered as the background of the profile view of the first account (e.g., previously agreed flag bits, etc.), and the video registered as the background of the profile view of the first account.

FIG. 4 illustrates screenshots of a messenger application according to an example embodiment.

Referring to FIG. 4, a friend list screen 410 of a messenger application may provide information about users registered as friends. The friend list screen 410 may include a friend's video list region 411 in a predetermined area. The friend's video list region 411 may include a region 412 in which profile information of a friend who registered a video as a background of a profile view (or profile information of a friend who registered a video as a background of a profile view within a predetermined time period) is provided. Although FIG. 4 illustrates that the friend's video list region 411 is in an intermediate portion of the friend list screen 410, a location of the friend's video list region 411 is not limited thereto.

When there is no terminal of a friend who registered a video as a background of a profile view, a video list region 411 may not be exposed or a predetermined notice banner may be provided in the region 412 instead of profile information of a friend's terminal.

The video list region 411 may always be fixed, or the video list region 411 may be folded. When the video list region 411 is folded, a predetermined mark, for example, a red dot may be exposed.

The video list region 411 may further include a video registration region. When a user selects the video registration region, an interface (e.g., a popup window) for registering a video as a background of a profile view of the user may be provided. Also, an edit view for editing the profile view may be provided so that the user is induced to register the video as the background of the profile view through the edit view.

When the region 412 in which the profile information of the friend's terminal is provided is selected, a profile view screen 420 of the selected friend's terminal may be provided. The profile view screen 420 may include a profile view background region 423. In the profile view background region 423, the video registered as the background of the profile view may be played.

If a predetermined condition is satisfied, the video may be automatically played when entering the profile view screen 420. Also, the video may be automatically repetitively played.

If the predetermined condition is not satisfied, the video may not be automatically played when entering the profile view screen 420. Instead, a static image that is automatically extracted from the video or set by the user in advance may be exposed.

The profile view screen 420 may include a play button region 421. The play button region 421 may include a play button for playing or pausing the video and a playback time indicating region. In a case of a user terminal in which a condition to automatically play in a Wi-Fi environment only is set, a notification indicating that the video is playable may be displayed so that the video is to be directly played in a data network environment. Once the play button is selected, the play button may be replaced by a pause button.

A profile main view screen 420 may include a sound display region 422. The sound display region 422 may be a region for performing a sound control of a video with sound. By tapping the sound display region 422, the sound may be on and off.

When the profile view background region 423 is selected, a video viewer screen 430 may be provided. In the video viewer screen 430, the video may be exclusively played while other items included in the profile view are not displayed.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. An operation method of a messenger application for a second account related to a plurality of friend accounts in an instant messaging service, the method comprising:
   receiving, by an electronic device for the second account, from a server that provides the instant messaging service, information of at least one first account that has a video registered as a background of a profile view thereof, from among the plurality of friend accounts;
   displaying, on the electronic device for the second account, a list view that shows a first list comprising the at least one first account that has the video registered as the background of the profile view thereof within a predetermined time period, in a manner distinguished from a second list of the plurality of friend accounts;
   displaying, on the electronic device, an edit view providing a function of editing a profile view of the second account and a preview function for an edited profile view;
   receiving, by the electronic device, an input of selecting an account from the first list comprising the at least one first account displayed; and
   in response to the receiving of the selection of the account from the first list, displaying, on the electronic device, a profile view of the selected account in which a registered video corresponding to the selected account is played on an entire area of a background region and in which i) a profile image and profile information of the selected account are further displayed, ii) a chat button to launch a chat interface with the selected account is further displayed, and iii) the registered video is automatically played on the entire area as the background of the profile view,
   wherein the displaying of the profile view of the selected account replaces the displaying of the list view,
   wherein the plurality of friend accounts comprises the account in a friend relationship with the second account in the instant messaging service.

2. The operation method of claim 1, further comprising:
   receiving, by the electronic device, a directional input corresponding to a movement to a direction among a plurality of predetermined directions while the profile view of the selected account is displayed;
   identifying, by the electronic device, an account adjacent to the selected account in the direction in the first list comprising the at least one first account on the list view; and
   displaying, on the electronic device, a profile view of the identified adjacent account in which a registered video corresponding to the identified adjacent account is played as a background.

3. The operation method of claim 1, wherein the list view shows the second list of the plurality of friend accounts using a first-type list element and shows the first list comprising the at least one first account using a second-type list element, wherein the at least one first account is provided in plural,
   wherein the displaying of the list view includes:
   displaying, on the electronic device, the second list of the plurality of friend accounts and the first list comprising the at least one first account in different rows, and
   displaying, on the electronic device, all the first accounts included in the first list in a same row.

4. The operation method of claim 1, wherein when the profile view of the selected account is displayed, the displaying comprises:
   determining, by the electronic device, whether a predetermined condition related to playing of the video is satisfied; and
   automatically repetitively playing, on the electronic device, the corresponding video as a background of the profile view of the selected account in accordance with a determination that the predetermined condition is satisfied.

5. The operation method of claim 4, further comprising:
   displaying, on the electronic device, a static image set by the selected account as a background of the profile view of the selected account in accordance with a determination that the predetermined condition is unsatisfied.

6. The operation method of claim 1, wherein the displaying comprises:
   sorting, by the electronic device, the at least one first account based on a predetermined sorting order; and
   displaying, on the electronic device, the at least one first account using the list view based on a result of the sorting.

7. The operation method of claim 6, wherein the predetermined sorting order comprises
   a sorting order related to a message exchanged with the at least one first account.

8. The operation method of claim 1, wherein the at least one first account comprises an account that has agreed to recommend the registered video to another terminal.

9. The operation method of claim 1, wherein when a plurality of videos is registered within a predetermined time in the same account among the at least one first account, the displaying comprising:
   displaying, on the electronic device, the corresponding account based on a recently registered video.

10. The operation method of claim 1, further comprising:
    displaying, on the electronic device, an interface that prompts a registration of a video as a background of a profile view of the second account using a list element of a type by which the first list comprising the at least one first account is represented.

11. A computer program embodied on a non-transitory computer readable medium, the computer program being configured to control a processor to perform the operation method of claim 1.

12. The operation method of claim 1, further comprising:
    receiving, by the electronic device, an input of selecting the background region in the profile view of the selected account; and
    in response to the selection of the background region in the profile view of the selected account, displaying, on the electronic device, a video viewer screen in which the video is played while the profile image, the profile information and the chat button included in the profile view are not displayed.

* * * * *